United States Patent [19]
Marion

[11] 3,907,703
[45] Sept. 23, 1975

[54] PROCESS FOR PRODUCING REDUCING GAS

[75] Inventor: Charles P. Marion, Mamaroneck, N.Y.

[73] Assignee: Texaco Development Corporation, New York, N.Y.

[22] Filed: Mar. 28, 1973

[21] Appl. No.: 345,798

Related U.S. Application Data

[62] Division of Ser. No. 211,443, Dec. 23, 1971, Pat. No. 3,767,379.

[52] U.S. Cl. .............................. 252/373
[51] Int. Cl.² ........................... C01B 2/14
[58] Field of Search ............. 252/373; 75/42

[56] References Cited
UNITED STATES PATENTS

| 2,863,527 | 12/1958 | Herbert et al. | 252/373 UX |
| 3,126,276 | 3/1964 | Marshall et al. | 75/35 X |
| 3,232,728 | 2/1966 | Reynolds | 252/373 X |
| 3,591,364 | 7/1971 | Reynolds et al. | 75/42 |
| 3,709,669 | 1/1973 | Marion et al. | 252/373 X |
| 3,740,204 | 6/1973 | Slater et al. | 252/373 X |

Primary Examiner—Howard T. Mars
Attorney, Agent, or Firm—T. H. Whaley; C. G. Ries; Albert Brent

[57] ABSTRACT

All of the hot effluent reducing gas from a partial oxidation reducing gas generator is mixed with a comparatively cooled and cleaned portion of the reducing gas to produce a stream of improved reducing gas at the proper temperature for injecting into an ore reduction zone e.g., iron-ore blast furnace. Optionally, cooled, cleaned and purified off-gas from the ore reduction zone may be mixed with the reducing gas.

5 Claims, 1 Drawing Figure

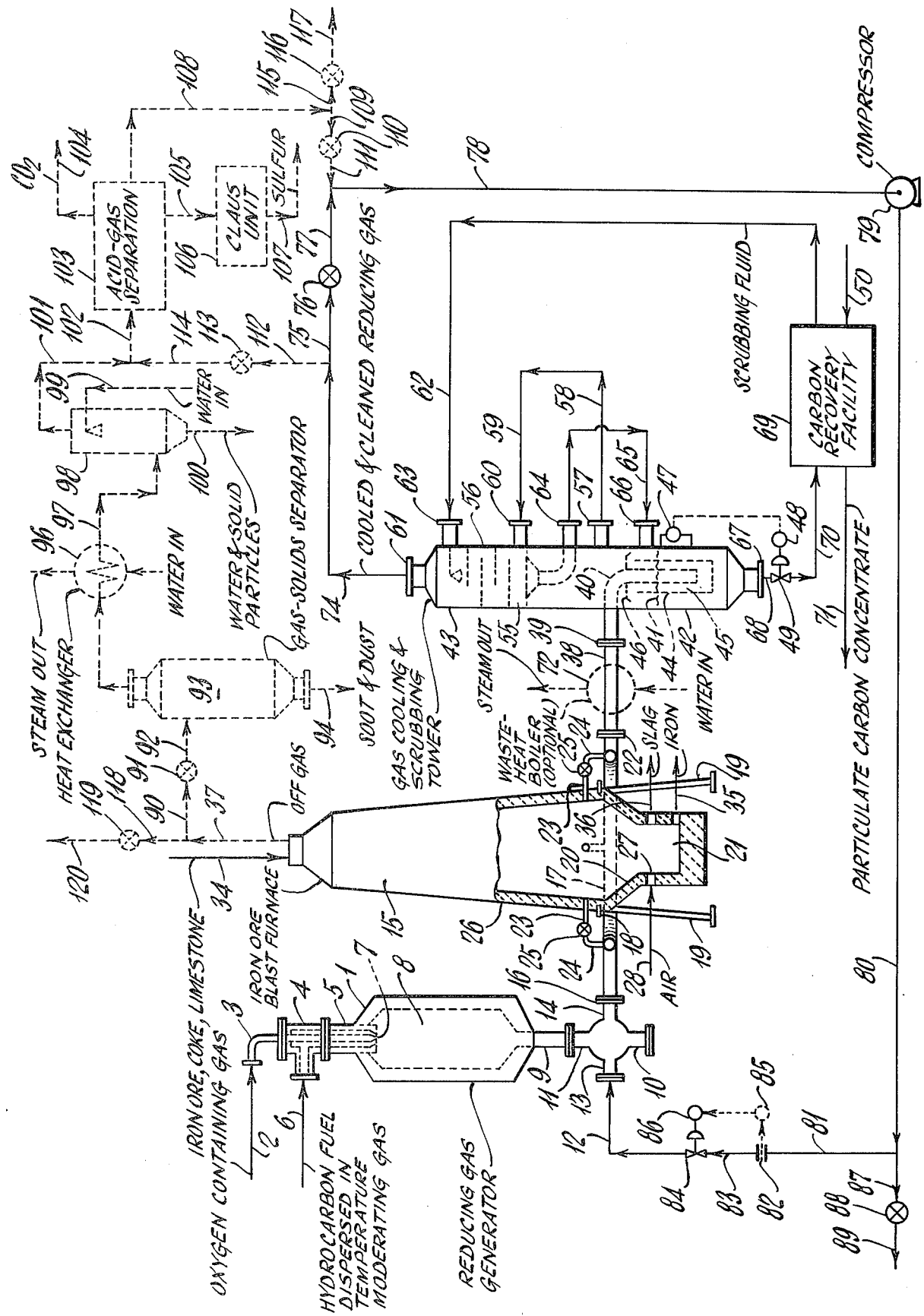

PROCESS FOR PRODUCING REDUCING GAS

This is a division of application Ser. No. 211,443, filed Dec. 23, 1971, now U.S. Pat. No. 3,767,379.

BACKGROUND OF THE INVENTION

1. Field of the Invention

This invention relates to the use of reducing gas to effect the reduction of metal ores. In one of its more specific aspects, the present invention consists of a continuous process for producing gas by partial oxidation of a hydrocarbon fuel, improving the reducing gas by mixing all of it with a comparatively cooler and cleaner mixture of reducing gas produced subsequently in the process, and introducing a portion of the improved reducing-gas mixture into an integrated iron-ore blast furnace to reduce the ore to iron.

2. DESCRIPTION OF THE PRIOR ART

By means of a conventional iron-ore blast furnace, iron ore comprising mainly iron oxide may be reduced to molton iron. The reducing agents principally comprising carbon monoxide and carbon are produced within the blast furnace from coke which is part of the charge. For every pound of iron ore, the blast furnace is charged with about one-half pound of coke. Thus, additional iron ore may be processed in a specific ore-reduction zone merely by replacing all or a portion of the coke with a stream of externally produced reducing gas in the manner shown, for example, in coassigned patents U.S. Pat. No. 2,740,706 P. L. Paull and F. B. Sellers, and U.S. Pat. No. 3,591,364 B. Reynolds and C. G. Ludeman.

Reducing gas is commonly produced by processes described in the prior art at temperatures which are too high to permit injecting the reducing gas directly into an ore-reduction zone. Further, the reducing gas so produced may have an undesirable amount of water vapor and entrained particulate carbon thereby limiting its use as a reductant. One advantage of the subject process is that it avoids the need for large sized waste-heat boilers and quench tanks commonly used to cool the effluent gas from a reducing gas generator.

SUMMARY

An ore reduction process in which all of the effluent reducing gas leaving a reducing gas generator is continuously mixed in a mixing zone with an upgraded recycle stream of reducing gas produced subsequently in the process to produce a comparatively cooled, cleaned and otherwise improved stream of reducing gas. Downstream from the mixing zone, a portion of said stream of improved reducing gas is continuously withdrawn and introduced into an ore reduction zone, such as an iron-ore blast furnace. The remainder of the stream of impoved reducing gas is recycled to said mixing zone by way of a gas-cooling and cleaning zone. The stream of cooled and cleaned reducing gas produced in said gas cooling and cleaning zone is compressed and at least a portion is introduced into said mixing zone as said upgraded recycle reducing gas. Optionally, a portion of the off-gas from said ore-reduction zone is cooled, cleaned, and treated to remove $CO_2$ and $H_2S$. At least a portion of this treated off-gas is then admixed with at least a portion of the aforesaid stream of reducing gas leaving the gas-cooling and cleaning zone to constitute the aforesaid upgraded recycle reducing gas.

By means of the subject process, the reducing ratio i.e. moles of $(H_2 + CO)/(H_2O + CO_2)$, of the reducing gas is increased. Thus, by introducing the improved reducing gas into an ore-reduction facility such as an iron-ore blast furnace, the weight of metallurgical coke charged per unit weight of metal produced is decreased. Further, by means of the subject improved process, the temperature of the effluent reducing gas leaving the gas generator is immediately reduced to a suitable temperature for injecting into an ore-reduction zone without requiring costly gas-quenching or heat-exchange equipment. By reducing the gas temperature according to the new process thermal damage to the conduits connecting the reducing-gas generator to the ore-reduction zone, or to any heat exchangers that may be in that section of the line, is prevented. In addition to cooling the reducing gas, by means of the subject process, the quantities of water vapor and entrained particulate carbon in the reducing gas are substantially reduced. Thus, an improved and more efficient reducing gas is produced.

DESCRIPTION OF THE INVENTION

The present invention involves an improved continuous ore-reduction process in which reducing gas produced in an external separate gas generator is introduced into an ore-reduction zone to effect reduction of the metallic ore. The process is suitable for use in a wide range of ore-reduction processes in which supplemental amounts of reducing gas are injected into the reducing zone to effect reduction of the metal oxides to molten metal. For example, this process may be used in conjunction with (1) an iron-ore vertical blast furnace for producing metallic iron from iron oxides, (2) a fluidized bed of powdery ores, (3) a rotary kiln for reducing ores and (4) a shaft-type furnace for reducing iron ore to sponge iron.

The reducing gas is produced in the refractory-lined reaction zone of a free-flow unpacked non-catalytic partial-oxidation reducing-gas generator, such as shown in the drawing and described in coassigned U.S. Pat. No. 2,809,104 issued to Dale M. Strasser et al.

A wide range of hydrocarbons may be reacted in the gas generator with an oxygen-containing gas and optionally in the presence of a temperature-moderating gas to produce the reducing gas.

The term hydrocarbon fuel as used herein to describe various feedstocks is intended to include gaseous and liquid hydrocarbon fuels. Also to be included within the definition are (1) pumpable slurries of solid carbonaceous fuels, such as coal, particulate carbon, and petroleum coke in a carrier, such as water, or in a liquid hydrocarbon fuel, and mixtures thereof; (2) gas-solid suspensions, such as finely-ground solid carbonaceous fuels dispersed in either a temperature-moderating gas or a gaseous hydrocarbon; and (3) gas-liquid-solid dispersions, such as atomized liquid hydrocarbon fuel and particulate carbon dispersed in a temperature-moderating gas.

The term liquid hydrocarbon fuel as used herein to describe liquid feedstock is intended to include various materials, such as liquified petroleum gas; petroleum distillates and residues, gasoline, naphtha, kerosine, crude petroleum, asphalt, gas oil, residual oil, tar-sand oil; aromatic hydrocarbons, such as benzene, toluene, xylene fractions, coal tar, cycle gas oil from fluid-catalytic-cracking operation; furfural extract of coker gas oil; and mixtures thereof. Gaseous hydrocarbon fuels, as used herein to describe gaseous feedstocks, include methane, ethane, propane, butane, pentane, natural gas, water gas, coke-oven gas, refinery gas, acetylene tail gas, ethylene off-gas, and mixtures thereof. Both gaseous and liquid feeds may be mixed and used simultaneously and may include paraffinic, olefinic, and aromatic compounds in any proportion. The hydrocarbon feed may be at room temperature or may be preheated to a temperature up to as high as about 600° to 1200°F., but below its cracking temperature. The liquid hydrocarbon feed may be introduced into the burner in liquid phase or in a vaporized mixture with or without steam or other moderator.

The term oxygen-containing gas, as used herein, is intended to include air, oxygen-enriched air, i.e., greater than 21 mole % oxygen, and substantially pure oxygen, i.e. greater than 95 mole % oxygen. Oxygen-containing gas may be introduced into the burner at a temperature in the range of about ambient to 1800°F. The ratio of free oxygen in the oxidant to carbon in the feedstock (O/C, atom/atom) is in the range of 0.7 to 1.5.

$H_2O$ may be charged to the reaction zone in liquid or gaseous phase. It may be in the form of steam or atomized liquid water. Further, all of the $H_2O$ may be mixed either with the hydrocarbon feedstock or with the oxygen-rich gas. Alternately, a portion of the steam may be intermixed with the oxygen stream in conduit 3 in an amount less than about 25 weight percent of the oxygen and any remainder mixed with the hydrocarbon. The $H_2O$ may be at a temperature in the range of ambient to 1000°F., or above. For example, the weight ratio of water to liquid hydrocarbon feed is in the range of about 0.05 to 6, and usually in the range of about 0.05 to 0.25 parts by weight of water per part by weight of hydrocarbon feed, according to the final use of the product gas.

$H_2O$ serves to moderate the temperature in the reaction zone of the reducing-gas generator. It may also react with the other feedstreams in the generator. Other suitable temperature moderators which may be used in place of or in combination with $H_2O$ include a cooled portion of the reducing gas, cooled off-gas from an integrated ore-reduction zone, e.g. blast furnace, carbon dioxide, various off gases from other processes, an inert gas, e.g. nitrogen, and mixtures thereof. For reducing-gas applications it is desirable to use only a minimum amount of $H_2O$ and/or $CO_2$.

The use of a temperature moderator to moderate the temperature in the reaction zone is optional and depends in general on the carbon to hydrogen ratio of the feedstock. For example, a temperature moderator is generally not used with gaseous hydrocarbon fuels; however, generally it is used with liquid hydrocarbon fuels. As previously mentioned, the temperature moderator may be introduced as a component of either or both reactant streams. In addition, the temperature moderator may be introduced by itself via a separate conduit in the burner, not shown.

The feedstreams are reacted by partial oxidation without a catalyst in the reaction zone of a free-flow gas generator. The mixture of effluent reducing gas may have the following composition (volume%—dry basis) if it is assumed that the inert gases are negligible: CO 33–52, $H_2$ 62–42, $CO_2$ 1.5–8, $CH_4$ 0.02–2, $H_2S$ nil to 2.0 and COS nil to 0.1. Unreacted particulate carbon (on the basis of carbon in the feed by weight) is about 0.2 to 12 weight percent from liquid feeds but is usually negligible from gaseous hydrocarbon feeds.

The partial-oxidation reaction takes place in the reaction zone of the gas generator at an autogenous temperature in the range of about 1500° to 3500°F. and preferably in the range of about 2400° to 2900°F. and at a pressure in the range of about 1 to 350 atmospheres and preferably in the range of about 0.1 to 2.0 atmospheres above the pressure of the reducing zone.

All of the hot effluent reducing gas stream leaving the gas generator is cooled to a suitable temperature for injecting into the ore-reduction zone. For example in a preferred embodiment of the invention in which the ore-reduction zone is a conventional iron-ore blast furnace, a reducing-gas temperature in the range of about 1800° to 2300°F. is often preferred. The stream of reducing gas, cooled to this temperature range, is injected into the iron-ore blast furnace by way of a plurality of injection ports. These ports are fed by a large bustle pipe which encircles or surrounds the shaft of the blast furnace at or near the mantle. The aforesaid cooling takes place in an in-line mixing connector. All of the hot reducing gas stream leaving the gas generator is introduced into the mixing connector simultaneously with a stream of recycled upgraded reducing gas. The recycled upgraded reducing gas stream was previously cooled to a temperature in the range of about 100° to 700°F., dried, cleaned to remove substantially all of the entrained particulate carbon, and compressed to substantially the same pressure as that of the hot reducing gas leaving the gas generator or slightly above. Preferably, about 0.2 to 0.6 moles of recycled upgraded reducing gas stream are introduced into the mixing connector per mole of effluent reducing gas stream from the gas generator. The actual flow rate for each stream of reducing gas that is simultaneously introduced into the mixing connector is determined by heat and weight balances so that a combined improved stream of reducing gas is produced continuously with the proper temperature to effect reduction.

Thus, a portion of the stream of improved reducing gas mixture leaving the mixing connector at a lower temperature than that of the hot effluent gas from the gas generator and having a substantial reduction in particulate carbon and $H_2O$ is injected into the ore-reduction zone to effect reduction of the metal ore therein. Simultaneously, the remainder of the stream of partially cooled improved reducing gas is introduced into a gas cooling and scrubbing facility. The stream of reducing gas is cooled still further in the gas cooling and scrubbing facility. The gas is scrubbed free of particulate carbon and its content of water vapor is reduced. The gas stream is then compressed, and recycled to said mixing connector as said previously described stream of recycled upgraded reducing gas.

In a preferable arrangement with respect to the previously described bustle pipe surrounding the iron-ore blast furnace, the stream of improved reducing gas is preferably removed from the bustle-pipe manifold by way of a flanged outlet located at the opposite end from the flanged inlet to the bustle pipe and passed into the aforesaid gas cooling and scrubbing facility. Advantageously, this arrangement keeps the large bustle pipe at a uniform temperature thereby preventing its damage due to uneven expansion. Suitable conventional gas cooling and cleaning procedures may be used. Preferably, the gas stream is introduced below the surface of a pool of quenching and scrubbing fluid by means of a dip-tube unit as shown in the drawing in lower chamber 42 of Gas Scrubbing Tower 43, to be further described.

Optionally, a portion of the heat in the hot reducing gas leaving the bustle pipe may be reclaimed by passing the reducing gas through a waste-heat boiler, in indirect heat exchange with water, so as to produce steam for use in the process or for export. This cooling is done prior to introducing the reducing gas into the gas-scrubbing facility. Since the improved reducing gas was previously cooled in the mixing connector, the aforesaid waste-heat boiler may be comparatively small. When required, additional entrained particulate carbon may be removed by passing the effluent gas through a second stage of scrubbing. For example, an orifice-type scrubber or venturi or nozzle scrubber, such as shown in Perry's Chemical Engineers' Handbook, Fourth Edition, McGraw-Hill 1963, Pages 18–54 to 56, may be used. By this means the reducing-gas stream may be accelerated through a nozzle-type scrubber. The high gas velocity atomizes the scrubbing fluid into fine droplets on which the carbon particles collect as the drops are accelerated through the gas stream. The carbon-laden droplets then agglomerate and may be separated from the gas stream in the upper section of the gas-scrubbing tower. The dispersion of scrubbing-fluid droplets in high velocity reducing gas is discharged from the scrubbing nozzle and, if necessary, passed through a third stage of scrubbing. For example, the reducing gas stream may be finally contacted with fresh scrubbing fluid at a temperature in the range of about 100°F. to 900°F. by means of a second dip-leg unit similar to that previously described. Alternately or in addition, this third-stage scrubbing may be effected in a liquid gas contacting tray-type column, such as shown in the drawing (upper chamber 43). Suitable liquid-gas tray type columns are more fully described in Perry's Chemical Engineers' Handbook, Fourth Edition, McGraw-Hill 1963, pages 18–3 to 5. In one embodiment of my invention, the entire scrubbing zone comprises such a liquid-gas tray-type column.

Thus, as previously described, the scrubbing fluid may flow successively through a one to four-stage gas-scrubbing zone, countercurrently to the reducing-gas stream which is being scrubbed free of particulate carbon. In a preferred arrangement as shown in the drawing, the concentration of particulate carbon in the liquid scrubbing medium increases as the scrubbing medium flows from the last to the first stage. The dispersion of carbon in the scrubbing fluid leaving the last scrubbing stage contains about 0.02 to 1.5 weight percent of particulate carbon. The slurry of carbon in scrubbing fluid leaving the first stage contains about 0.5 to 20 weight percent of particulate carbon. Optionally, these slurries may be drawn off as separate streams for recycle scrubbing or for fuel.

The reducing gas leaves the gas-scrubbing zone substantially free of entrained particulate carbon and at a temperature in the range of about 700°F. to 100°F. As previously mentioned, this gas is then compressed to a pressure about equal to that of the reducing gas leaving the gas generator and is recycled to the mixing connector.

The scrubbing fluid may be water or a liquid hydrocarbon. When the scrubbing fluid is a liquid hydrocarbon, the upper temperature is limited by the cracking temperature of the liquid hydrocarbon while the lower temperature must be above the dew point. The amount of volatilized scrubbing fluid in the scrubber overhead stream may be maintained in a preferred range of about 0 to about 5 1 mole percent (on the basis of the moles of scrubbing fluid) by using as a scrubbing fluid a 900+°F. resid. heavy liquid hydrocarbon fraction. The pressure in the scrubbing zone is in the range of about 1–350 atmospheres and preferably about the same as in the gas generator. If the reduction zone is an iron-ore blast furnace a scrubbing zone pressure in the range of 1 to 5 atmospheres is suitable. The temperature of the liquid hydrocarbon scrubbing fluid therein is in the range of about 150°F. to 750°F. When the scrubbing fluid is water, the temperature of the water is in the range of about 400°F. to 100°F. The upper temperature is fixed by the saturation temperature, at the pressure within the gas scrubbing tower, so as to substantially maintain the water in liquid phase.

It is economically desirable to recover and to recycle clear scrubbing fluid from the slurry of carbon and scrubbing fluid. This may be done by any suitable means, e.g., filtration, centrifuge, gravity settling, and liquid hydrocarbon extraction such as described in co-assigned U.S. Pat. No. 3,147,093 by R. M. Dille et al.

In a preferred embodiment of the process, the scrubbing fluid is water; and the slurry of carbon and water from the gas-scrubbing facility is introduced into a carbon-recovery facility in which the slurry is separated into a stream of clear water and a slurry stream of hot fuel-oil and particulate-carbon containing about 3 to 20 weight percent of carbon. The clear water is recycled to the gas-scrubbing facility to scrub more reducing gas. In one embodiment the slurry of fuel-oil and particulate-carbon at a temperature in the range of about 150° to 300°F. is dispersed in a temperature moderating gas selected from the group consisting of steam, carbon dioxide, a portion of cooled recycle reducing gas, a portion of cooled and cleaned off-gas from an ore-reduction zone, and an inert gas, such as nitrogen. The fuel dispersion is then passed through a suitable burner and into the reaction zone of a free-flow non-catalytic reducing-gas generator. Simultaneously, a stream of oxygen-containing gas, such as substantially pure oxygen at a temperature in the range of about 100° to 150°F. is passed into the reaction zone of the gas generator by way of the burner. The two streams impinge against each other producing a fine mist which reacts by partial oxidation at an autogenous temperature in the range of about 1500° to 3500°F. and a pressure in the range of about 1 to 350 atmospheres to produce reducing gas, as previously mentioned.

Within the above-mentioned carbon-recovery facility, the slurry of carbon and water from the gas-scrubbing facility is contacted with naphtha so as to form a light hydrocarbon liquid fuel-particulate carbon slurry and a clarified water phase. The clarified water phase is then separated from the light hydrocarbon liquid fuel-particulate-carbon slurry in a decanter, admixed with makeup water, and recycled to the gas-scrubbing facility as previously described for use in quench cooling and scrubbing more effluent synthesis gas from the gas generator. Low cost petroleum fuel oil is then mixed with the light hydrocarbon liquid fuel-particulate carbon slurry. In a distillation column the light hydrocarbon liquid fuel is distilled off and reused to extract more carbon from the aforesaid particulate carbon-water dispersion. Hot fuel oil-particulate carbon slurry containing about 3 to 20 weight percent of carbon is removed from the bottom of the distillation column, optionally mixed with additional fuel oil, dispersed in temperature-moderating gas, and introduced into the reducing-gas generator.

In another embodiment of the invention, a portion of the off-gas from the ore-reduction zone is cleaned, cooled, purified, and mixed with a portion of the cooled and cleaned reducing gas from the gas-scrubbing tower. This relatively cool mixture of reducing-gas and off-gas at a temperature in the range of about ambient to 400°F. is compressed to about the same pressure as the hot effluent gas from the reducing-gas generator and mixed with said effluent reducing gas so as to produce a suitable stream of reducing-gas mixture at a temperature in the range of about 2300° to 1500°F. for injection into an ore-reduction zone as at least a portion of the reducing agent. For example, when introduced into an iron-ore blast furnace, this reducing-gas mixture is preferably passed up through the descending charge. The reducing-gas mixture is injected into the blast furnace preferably above the mantle, where the temperature is in the range of about 1800° to 2300°F.

The exit temperature of the off-gas from the ore-reduction zone e.g. iron-ore blast furnace may be in the range of about 300° to 600°F., and may contain about 4 to 20 grains of dust and about 7 to 50 grains of water vapor per standard cubic foot. As previously mentioned, this off-gas is cleaned, cooled, dried, and introduced into an acid-gas separation facility in which $CO_2$ and $H_2S$ are removed.

The dust particles in a blast furnace may vary in size from about one-fourth inch to a few microns. Any suitable gas-solids separator may be used. For example, conventional blast-furnace dust catchers may be used to remove as much as possible of the dry dust. In such case, the off-gas flows downward through a centrally located vertical pipe within the dust collector when suddenly the direction of flow is changed. The velocity and change of direction cause soot and solid dust particles to drop from the gas stream. Since dry cleaning removes dust without cooling, the sensible heat in the off-gas optionally may be recovered by indirect heat exchange with water. The steam produced thereby may be used where required elsewhere in the process.

The remainder of the dust may be removed by such conventional procedures as centrifugal machines, cyclone separators, Cottrell precipitators, filters, and water scrubbing. Wet cleaners include stationary and revolving spray towers, baffle towers, and spray fans. Incidentally, the gas being scrubbed is cooled to about the temperature of the wash water, and any moisture in excess of saturation at this temperature is precipitated.

$CO_2$, $H_2S$, $NH_3$ and COS may be removed from the cooled and cleaned stream of off-gas from the ore-reduction zone, from the cooled and scrubbed reducing gas, and from mixtures thereof in an acid-gas separation zone. Suitable conventional processes may be used involving refrigeration and physical or chemical absorption with solvents, such as n-methylpyrrolidone, triethanolamine, propylene carbonate, or alternately with hot potassium carbonate. In solvent absorption processes, most of the $CO_2$ absorbed in the solvent can be released by simple flashing. The rest may be removed by stripping. This may be done most economically with nitrogen that may be available free of cost, if an air-separation unit is available for producing substantially pure oxygen (95 mole % $O_2$ or more) for use in the reducing gas generator. It is possible to recover a stream of $CO_2$ having a purity of more than 98.5%. Optionally, the recovered stream of $CO_2$ may be recycled to the reducing-gas generator for use as all or a portion of the temperature-moderating gas. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide.

Similarly, the $H_2S$ and COS containing solvent is regenerated by further flashing and stripping with nitrogen. The $H_2S$ and COS are then coverted into sulfur by a suitable process; for example, the Claus process for producing elemental sulfur from $H_2S$ as described in Kirk-Othmer Encyclopedia of Chemical Technology, Second Edition Volume 19, John Whiley, 1969, Page 352. Excess $SO_2$ may be removed and discarded in chemical combination with limestone, or by means of a suitable commercial extraction process.

DESCRIPTION OF THE DRAWING

A more complete understanding of the invention may be had by reference to the accompanying schematic drawing which shows the previously described process as applied to blast-furnace operations. The drawing illustrates by full lines the preferred embodiment of the continuous process of this invention. Alternate embodiments are illustrated in the drawing by dotted lines. It is not intended to limit the invention to the particular apparatus or material described or illustrated.

With reference to the drawing, the numeral 1 designates a free flow non-catalytic refractory-lined reducing-gas generator of conventional design, such as that referred to previously in U.S. Pat. No. 2,809,104. An oxygen-containing gas in line 2 is passed through the center conduit 3 of an annular burner 4 which is positioned in flanged inlet 5 located at the top of gas generator 1 in axial alignment. A mixture, of hydrocarbon fuel and carbon slurry (produced subsequently in the process) entrained in a temperature moderating gas to form a dispersion in line 6, is passed through an outer concentric conduit disposed about said central conduit, then through converging coaxial concentric annulus nozzle 7 at the downstream end of burner 4, and then into the reaction zone 8 of reducing-gas generator 1. The stream of fuel dispersion and the stream of oxygen-containing gas impinge on each other in the reaction zone at a short distance downstream from the downstream end of burner 4.

A stream of hot effluent reducing gas continuously leaves gas generator 1 by way of axially aligned flanged outlet 9 located at the bottom of gas generator 1, and passes immediately into refractory-lined and insulated mixing connector 10 by way of passage 11. A second stream of reducing gas in line 12 is introduced into mixing connector 10. This second stream of reducing gas was previously cooled, cleaned, and compressed in a manner to be subsequently described, before being introduced into mixing connector 10 by way of passage 13. There it mixes with and cools to a predetermined temperature all of the hot generator-effluent reducing gas entering by way of passage 11. A comparatively cleaner and cooler stream of reducing gas leaves mixing connector 10 by way of passage 14. Its H₂O content, temperature and content of entrained particulate carbon are less than those of the gas stream in passage 11 but are somewhat greater than those of the gas stream in passage 13.

Downstream from mixing connector 10, a portion of the mixed stream of improved reducing gas is withdrawn at the proper temperature for introduction into iron-ore blast furnace 15. The reducing gas is continuously passed into blast furnace 15 to effect the reduction of iron-ore therein and the production of molten iron, by way of flanged entrance port 16 and refractory-lined and insulated bustle pipe 17 which surrounds the blast furnace at a level near mantle 18. Mantle 18 is a horizontal heavy steel ring that rests on a plurality of columns 19. The mantle supports the steel blast-furnace shell and the inwall brickwork. The frusto-conical section located below the mantle is called the bosh 20. Hearth 21 is located at the lower end of the blast furnace and below the bosh 20. A portion of the reducing gas flows through bustle pipe 17 and out of a flanged exit port 22 located at the other end of the bustle pipe from flanged entrance port 16. This scheme permits the comparatively large bustle pipe 17 to have a uniform temperature. Problems due to uneven expansion of the metal and refractory components of the bustle-pipe assembly are thereby avoided.

A portion of reducing gas from bustle pipe 17 is distributed to each of a plurality of injector 23 by way of a duct 24 and valve 25. In a large blast furnace there may be 4 of more injectors circumferentially spaced around the vertical stack 26.

The reducing gas enters iron-ore blast furnace 15 by way of injector assembly 23. The injectors pass through the wall of the blast furnace at a position above mantle 18 where the temperature on the inside of the blast furnace is about the same as the temperature of the entering reducing gas, i.e., about 1800° to 2300°F. This position is substantially above blast tuyeres 27 through which air or oxygen-enriched air from line 28 is introduced into the blast furnace in the usual manner. This arrangement substantially precludes reaction between the hot oxygen-containing blast introduced through tuyeres 27 and the hot reducing gases introduced above through injector 23.

In the operation of vertical blast furnace 15, iron ore, coke, and limestone are charged by way of line 34 into the top of the furnace according to a predetermined cycle. Molten iron and slag are respectively drawn off at the bottom of the furnace by way of lines 35 and 36. Slowly moving down the shaft of the furnace, the charge is contacted by a rapid upward flow of hot gases. Part of these ascending gases originate in the bosh section 20 of the furnace and comprise the reaction products of coke in the charge with blasts of hot air injected into the furnace through the tuyeres 24, which are spaced peripherally around the lower part of the bosh. The rest of these ascending gases comprise a supplemental amount of reducing gas, from an external source, which is introduced into the furnace by way of injector 23, as previously described.

The gas leaving the bosh section of iron-ore blast furnace 15 is at a temperature of about 2400°F. and comprises, in percent by volume, about CO-32 H₂-15 and N₂-66.5. The supplemental reducing gas entering the furnace by way of injector 23 may be at a temperature in the range of about 1800° to 2300°F., and may comprise in volume percent dry basis CO-33 to 52, H₂-62 to 42, CO₂-1.5 to 8, CH₄-0.02 to 2, H₂S-0 to 2, COS-nil to 0.1, on the basis of no inert gases being present, and particulate carbon in an amount from about 0.1 to 8 weight percent (basis carbon in the feed). At full blast the gas travels through the full height of the furnace in about 3 seconds, emerges from the top of the furnace by way of line 37 as "off-gas" at a temperature of about 300°–500°F., and comprises in percent by volume dry basis about CO-15 to 40, CO₂-10 to 30, H₂-2 to 10, N₂-40 to 60, and inerts 0.5 to 5.

The charge, with its interstitial spaces filled with an ascending atmosphere of reducing gas, descends to regions of higher temperature as it moves down the blast furnace. At different levels of the blast furnace then, chemical reactions peculiar to the temperatures at these levels according to chemical kinetics and equilibrium occur. For example, in the upper portion of the stack at moderately high temperatures ranging from about 480° to 1295°F., the indirect reduction of Fe₂O₃ by CO and H₂ may take place. For example, by three successive exothermic steps, Fe₂O₃ may be successively reduced by CO to Fe₃O₄, FeO, and finally to Fe. The combined reaction follows:

$$Fe_2O_3 + 3CO \rightarrow 2Fe + 3CO_2 - 7800 \text{ BTU}$$

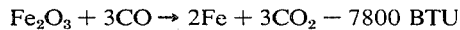

(I)

Free carbon particles that penetrate the porous ore may also act as a reducing agent for the oxides of iron at temperatures of about 940° to 1300°F. for example:

$$FeO + C \rightarrow Fe + CO + 67,430 \text{ BTU}$$

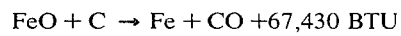

(II)

Heat required for endothermic reaction (II) may be supplied by exothermic reaction (I), so as to minimize the net heat-absorbing effect. At the bottom of the stack, where temperatures are above 2300°F., the oxides of manganese, silicon, and phosphorous are reduced by carbon.

As previously mentioned, a portion (20–60 percent depending upon the desired degree of cooling) of the reducing gas flows around bustle pipe 17 and out flanged exit port 22 located downstream from mixing connector 10. From there this portion of reducing gas is passed through flanged pipe section 38, flanged inlet 39, dip tube 40 and below the surface 41 of a pool of scrubbing fluid in lower chamber 42 of gas-cooling and scrubbing tower 43. Concentric pipe 44 surrounds dip tube 40 and forms an open ended annular passage 45 with the outside surface of dip tube 40. The reducing gas bubbles up through the scrubbing fluid in annulus 45, and emerges below splash plate 46. The velocity and volume of gas produces a turbulent condition in the scrubbing fluid which helps to scrub the bulk of the entrained particulate carbon from the gas and which cools the reducing-gas. Surface level 41 is maintained by means of level transmitter 47, level controller 48, and control valve 49. Make-up scrubbing fluid may be added by way of line 50.

The once scrubbed reducing gas enters space 55 which is bounded at the top by the floor of upper chamber 56 of gas scrubbing tower 43. Upper chamber 56 may be used when further scrubbing of the reducing gas is necessary. Any suitable gas-liquid scrubbing means may be employed. For example, four cross-flow trays equipped with bubble caps such as shown on pages 18–3 to 7 of Perry's Chemical Engineers' Handbook, Fourth Edition, 1963, McGraw-Hill, may be used. Thus, the reducing gas passes through flanged outlet 57, lines 58 and 59, flanged inlet 60 and into the bottom and up through and out of the top of upper chamber 56 by way of flanged outlet 61.

The scrubbing fluid enters at the top of gas-cooling and scrubbing tower 43 by way of line 62 and flanged inlet 63. In the present embodiment the scrubbing fluid is water. The scrubbing fluid flows down upper chamber 56, across each tray in direct contact with and counter-flow to the rising reducing gas and thereby removes substantially all of the entrained particulate carbon from the reducing gas. A slurry of carbon and scrubbing fluid leaves upper chamber 56 by way of flanged outlet 64 and enters, if necessary by pumping, into lower chamber 42 by way of line 65 and flanged inlet 66. The level 41 of the slurry of carbon and scrubbing fluid is controlled in the manner previously described. The concentration of carbon in the slurry is controlled preferably at about 1 weight % maximum by passing the slurry out of the bottom of gas-scrubbing tower 43 by way of flanged outlet 67, line 68, valve 49, and into carbon-recovery facility 69 by way of line 70. Carbon-recovery facility 69 may be any conventional method for concentrating carbon in water and producing clear water, e.g., filtration, centrifuge, or extraction with light liquid hydrocarbon fuel. The clear water is recycled and introduced into the top of gas scrubbing towere 43 by way of 62. Particulate carbon concentrate is removed by way of line 71.

Optionally, a small heat exchanger 72 may be inserted in the line in place of flanged line 38 upstream from the gas scrubbing tower and downstream from the blast furnace. In such instance, the hot reducing gas leaving flanged outlet 22 of bustle pipe assembly 17 is passed through waste-heat boiler 72 to produce steam. The temperature of the reducing gas is cooled by means of the waste-heat boiler to a low temperature so as to prevent the scrubbing fluid from being vaporized. The cooled reducing gas is then introduced into gas-scrubbing tower 43 by way of flanged inlet 39, in which it is further cooled by contact with a relatively large amount of cool, e.g. 100°F. scrubbing fluid.

The cooled and cleaned reducing gas leaving upper chamber 56 of gas-cooling and scrubbing tower 43 by way of flanged outlet 61 is passed by way of lines 74 and 75, valve 76, and lines 77 and 78 into compressor 79 in which the gas pressure is increased to about equal or slightly above that of the effluent reducing gas in passage 11. The cooled, cleaned and compressed reducing gas is passed through lines 80, 81, flow controllere 82, line 83, valve 84, and line 12 into flanged inlet 13 of mixing connector 10 as previously described, to cool the temperature of the hot generator-effluent reducing gas entering by way of duct 11. The amount of cooled reducing gas from line 12 required is controlled by flow controller 82. Flow controller 82 is set by hand depending upon the desired temperature of the mixed reducing gas in duct 14. Transmitter 85 transmits a signal to controller 86 which automatically adjusts the opening of valve 84. Controller 86 may also be operated by a temperature measuring device (not shown in the drawings) which may be inserted in passage 14.

Excess cooled and cleaned reducing gas may be exported from the system for use as fuel gas or synthesis gas by way of line 87, valve 88, and line 89.

In another embodiment of the invention, at least a portion of the off-gas leaving from the top of iron-ore blast furnace 15 by way of line 37 is passed through line 90, valve 91, line 92 and into a conventional gas-solids separator 93. Soot and dust may be eliminated from the off-gas by reducing the velocity and changing the direction of the gas flow through gas-solids separator 93. The soot and dust are discharged through line 94. The stream of off-gas is then passed through line 95 and heat exchanger 96 in which steam is produced. The off-gas is then passed through line 97 and into a tower-type washer 98 where it is washed with water entering by line 99 and leaving by line 100. This treatment reduces the dust content to less than about 0.02 grains per cubic foot and the temperature to about 70° to 200°F.

The cooled and cleaned off-gas is then passed through lines 101 and 102 into a conventional acid-gas separation facility 103 in which $CO_2$ and $H_2S$ are removed. The $CO_2$ steam leaves acid-gas separation zone by way of line 104 and the $H_2S$ stream leaves by way of line 105. The $H_2S$ stream is introduced into Claus unit 106 and converted into sulfur which is taken off by way of line 107. The up-graded off-gas is then passed through lines 108 and 109, valve 110, and line 111 into line 78 in which it is mixed with cooled and cleaned reducing gas from line 77. This reducing-gas mixture is compressed by compressor 79 and is introduced into mixing connector 10 by way of line 12 as previously described.

Optionally, all or a portion of the cooled and cleaned reducing gas in line 74 may be passed through acid-gas separation facility 103 by way of line 112, valve 113, and lines 114 and 102.

Excess upgraded off-gas may be removed by way of line 115, valve 116, and line 117. Excess off-gas from line 37 is vented to the atmosphere by way of line 118, valve 119 and line 120.

The following examples illustrate preferred embodiments of the operation of the process of this invention pertaining to the cooling of reducing gas for use in an iron-ore blast furnace which is integrated in the system. These examples are illustrative of preferred modes of operation but are not to be construed as limiting the scope of the invention. The process is continuous and the flow rates are specified on an hourly basis for all streams of materials.

EXAMPLE I 594,792 standard cubic feed (SCF) of reducing gas containing 541,667 SCF of ($H_2$+CO) are produced by partial oxidation of a hydrocarbon fuel in a conventional vertical free-flow refractory-lined reducing-gas generator. The reducing gas is produced at an autogenous temperature of about 2,850°F. at the exit from the reaction zone and at a pressure of about 3 atmospheres absolute. The average residence time in the gas generator is about 0.8 second. The reducing gas leaving the generator has the following composition in volume percent: CO 48.55, $H_2$ 42.50, $CO_2$ 1.89, $H_2O$ 6.83, $CH_4$ 0.02, A 0.11, $N_2$ 0.03, $H_2S$ 0.07, COS trace. About 397 pounds of unconverted particulate carbon are entrained in the effluent stream of reducing gas. The reducing ratio, i.e. moles of ($H_2$ + CO) divided by moles of ($H_2O + CO_2$), of the effluent reducing gas is about 10.4.

The aforesaid reducing gas is produced by continuously introducing the following charge into a non-catalytic reducing-gas generator by way of an annular type burner: 13032 pounds of total change consisting of 1686 pounds of steam at a temperature of about 325°F. and 11346 pounds of a hydrocarbon slurry at 175°F., which comprises liquid hydrocarbon and particulate carbon recovered subsequently in the process from a carbon-recovery facility. The aforesaid slurry consists of 105 pounds of particulate carbon and 11241 pounds of crude oil having the following ultimate analysis C 87.09, H 12.22, S 0.35, N 0.11, oxygen 0.18 and ash 0.05. Further, the crude oil has an API gravity of 22.8, a heat of combustion of 19208 BTU per pound, and a viscosity of 950 Saybolt Seconds Furol at 122°F. 158005 SCF of pure oxygen (contained in a stream of 99.6 mole percent $O_2$) at a temperature of 125°F. are introduced into the reaction zone of the gas generator by way of said burner.

All of the hot effluent reducing gas leaving the gas generator is mixed immediately upon issuance from the gas generator with 214,607 SCF of an upgraded recycle portion of the reducing gas which was cooled subsequently in the process to a temperature of 100°F. and from which substantially all of the particulate carbon and water vapor was removed. Otherwise, the composition of the upgraded recycle stream of reducing gas is substantially the same as that of the generator-effluent gas. Mixing of said streams of reducing gas takes place in a refractory-lined free-flow connector at the downstream exit of the reducing-gas generator. While the resulting stream of improved reducing gas mixture has substantially the same analysis (on a dry basis) as the effluent gas from the generator, the temperature of the reducing gas mixture leaving the mixing connector is reduced to about 2,200°F., and the concentrations of water vapor and entrained particulate carbon are each lowered about 26 percent by weight. The actual composition of the improved reducing gas mixture is as follows: CO 49.49, $H_2$ 43.33, $CO_2$ 1.93, $H_2O$ 5.02, $CH_4$ 0.02, A 0.11, $N_2$ 0.03, $H_2S$ 0.07, and COS trace. Further, the reducing ratio of the improved reducing gas mixture is increased to 13.4. This is a 30% increase over the effluent reducing gas from the gas generator. This also represents a decided economic advantage. In general, the higher the reducing ratio, the smaller the amount of gas required to reduce a specified amount of ore.

About 583,449 SCF of the improved reducing-gas mixture at a temperature of 2,200°F. is introduced into an otherwise conventional vertical shaft-type iron-ore blast furnace by way of about four circumferentially spaced injectors located above the mantle of the blast-furnace. The temperature on the inside of the blast furnace near the injection level is about the same as the temperature of the injected reducing gas. A large bustle pipe manifold which surrounds the shaft of the blast furnace distributes the reducing gas into the plurality of injectors.

The iron-ore blast furnace is charged with iron ore, metallurgical coke and limestone. Air is introduced through a plurality of circumferentially spaced tuyeres located near the bottom of the bosh. Periodically the blast furnace is tapped. Slag and iron ore are drawn off through separate holes near the bottom of the blast furnace. Off-gas is removed from the top of the iron-ore blast furnace. An analysis (dry basis) of the off-gas from the blast furnace in volume percent follows: CO 25, $CO_2$ 20, $N_2$ 50, $H_2$ 4, and inerts 1. Dust leaves the furnace entrained in the off-gas.

Usually in conventional blast-furnace operation, about 0.6 to 1.1 tons of coke are charged into the blast furnace per ton of iron produced. In this example however, advantageously this ratio is reduced. Thus, a portion of the metallurgical coke is replaced in the subject process by externally produced reducing gas which is injected into the blast furnace.

225,950 SCF of reducing gas leave the bustle pipe manifold from an outlet located at the other end from the inlet. This portion of reducing gas is then quenched and scrubbed with water in a gas-cooling and scrubbing zone in a manner as previously described. Substantially all of the water vapor and entrained particulate carbon are removed from the reducing gas. In the carbon-recovery facility, clear water is separated from the particulate carbon water dispersion and recycled to the gas-cooling and scrubbing zone. A slurry of particulate carbon and fuel oil is removed from the carbon-recovery facility for recycling as feed to the generator. The cooled and cleaned upgraded reducing gas is compressed to about 5 atmospheres, and 214,607 SCF at a temperature of 100°F. are mixed with all of the hot effluent from the reducing-gas generator in the mixing connector as previously described.

EXAMPLE II

This example demonstrates an embodiment of the invention in which all of the hot effluent reducing gas from the gas generator is mixing with a portion of the cooled, cleaned, and recycled reducing gas plus a portion of cleaned, cooled, and purified off-gas from the iron-ore blast furnace. In all other aspects the process of Example II is substantially the same as the process described in Example I. As will be shown below, the reducing-gas generator, charge to the gas generator, generator-operating conditions, and the analysis of the effluent reducing gas from the gas generator are substantially the same as described previously in Example I.

About 148,844 SCF of off-gas (dry basis) from the blast furnace at a temperature of about 300°F. are cooled, cleaned, and purified by conventional methods to produce a gas mixture substantially comprising (in mole percent) CO 31.25, $H_2$ 5.00, $N_2$ 62.50 and inerts 1.25. About 119,075 SCF of this upgraded off-gas at a temperature of 100°F. are mixed with about 119,075 SCF of cooled and cleaned reducing gas from the gas-cooling and scrubbing zone of Example I at a temperature of 100°F. This reducing-gas mixture has the following composition: CO 40.82, $H_2$ 19.75, $CO_2$ 0.87, $CH_4$ 0.76, A 0.05, $H_2S$ 0.03, and $N_2$ 37.72. When 238,150 SCF of this reducing-gas mixture at a temperature of 100°F. are mixed in the mixing connector with 595,375 SCF of the hot effluent reducing gas from the gas generator, a reducing mixture is produced having a temperature of about 2,200°F. and the following composition: CO 45.94, $H_2$ 36.61, $CO_2$ 1.61, $CH_4$ 0.23, A 0.09, $H_2S$ 0.06, $H_2O$ 4.93, and $N_2$ 10.53. The reducing ratio is 12.6. This represents a 21% increase over the reducing ratio of the effluent reducing gas from the gas generator. For direct ore reduction, a reducing gas should have the highest possible reducing ratio in order to give it maximum efficiency for the reaction with metallic oxides.

The process of the invention has been described generally and by examples with reference to feedstocks, reducing gas of particular compositions and an ore-reduction zone such as an iron-ore blast furnace for purposes of clarity and illustration only. It will be apparent to those skilled in the art from the foregoing that the various modifications of the process, ore-reduction zone, and the materials disclosed herein can be made without departure from the spirit of the invention. Further, the product gas may be used for other purposes e.g. synthesis gas, synthesis of oxygenated organic chemicals, manufacture of hydrogen.

I claim:

1. In a process for the production of a reducing gas mixture comprising principally carbon monoxide and hydrogen by the partial oxidation of a hydrocarbon fuel with a free-oxygen containing gas selected from the group consisting of air, oxygen-enriched air, i.e., greater than 21 mole % oxygen, and substantially pure oxygen, i.e. greater than 95 mole % oxygen and optionally in the presence of a temperature moderating gas selected from the group consisting of $H_2O$, $CO_2$, $N_2$, a cooled portion of reducing gas, and mixtures thereof, in a free-flow reaction zone of a reducing gas generator at an autogenous temperature within the range of about 1,500° to 3,500°F and a pressure in the range of about 1 to 350 atmospheres with the incidental production of minor amounts of particulate carbon, the improvement comprising:

1. mixing in a separate mixing zone all of the effluent reducing gas leaving said free-flow reaction zone with an upgraded reducing gas mixture from step (3) which was previously cooled to a temperature in the range of about 100° to 700°F to produce a product gas stream consisting of an improved reducing gas mixture containing reduced amounts of water vapor and particulate carbon and having a lower temperature than said effluent gas from said reaction zone;
   2. introducing a portion of said improved reducing gas mixture into a gas-cooling and scrubbing zone for removal of entrained particulate carbon located downstream from said mixing zone; and
   3. withdrawing cooled and cleaned reducing gas mixture from said gas-cooling and scrubbing zone in (2), compressing same to above the pressure of said effluent reducing gas from said reducing gas generator, and introducing said compressed reducing gas mixture into the mixing zone in (1) as said upgraded reducing gas mixture, wherein the ratio of moles of upgraded reducing gas stream per mole of effluent reducing gas streeam from said free-flow reaction zone is in the range of about 0.2 to 0.6.

2. The process of claim 1 provided with the additional steps of removing $CO_2$ and $H_2S$ from the reducing gas mixture leaving step (2).

3. The process of claim 1 provided with the additional steps of cleaning a portion of the off-gas from a separate ore-reduction zone by removing entrained soot and dust particles in a gas scrubbing zone; cooling in a gas cooling zone; and purifying said portion of off gas in a gas purification zone by removing gaseous impurities selected from the group consisting of $CO_2$, $H_2O$, $H_2S$, $NH_3$, COS, and mixtures thereof; and mixing said cleaned, cooled and purified portion of off-gas at a temperature in the range of about ambient to 400°F. with a portion of the reducing gas from said gas cooling and scrubbing zone in step (2) to produce the upgraded reducing gas mixture which is compressed and introduced into step (1), whereby said improved reducing gas mixture leaves step (1) with a temperature in the range of about 2,300° to 1,500°F.

4. The process of claim 3, wherein said ore-reduction zone is an iron-ore blast furnace for reducing iron oxides to iron.

5. The process of claim 3 provided with the additional step of removing $CO_2$ and $H_2S$ from the reducing gas mixture leaving the gas scrubbing zone and the gas cooling zone located downstream from said mixing zone.

* * * * *

UNITED STATES PATENT OFFICE
CERTIFICATE OF CORRECTION

PATENT NO. : 3,907,703
DATED : September 23, 1975
INVENTOR(S) : Charles P. Marion It is certified that error appears in the above-identified patent and that said Letters Patent are hereby corrected as shown below:

Column 9 line 56    Change "24" to --27--

Signed and Sealed this

Thirteenth Day of July 1976

[SEAL]

Attest:

RUTH C. MASON
Attesting Officer

C. MARSHALL DANN
Commissioner of Patents and Trademarks